US010673029B2

(12) United States Patent
Kim

(10) Patent No.: US 10,673,029 B2
(45) Date of Patent: Jun. 2, 2020

(54) HIGH POWER SECONDARY BATTERY

(75) Inventor: Sang-Uck Kim, Yongin-si (KR)

(73) Assignee: Samsung SDI Co., Ltd., Giheung-gu, Yongsin-si, Geonggi-do (KR)

( * ) Notice: Subject to any disclaimer, the term of this patent is extended or adjusted under 35 U.S.C. 154(b) by 1340 days.

(21) Appl. No.: 12/907,375

(22) Filed: Oct. 19, 2010

(65) Prior Publication Data

US 2011/0104549 A1 May 5, 2011

(30) Foreign Application Priority Data

Oct. 29, 2009 (KR) ........................ 10-2009-0103467

(51) Int. Cl.

*H01M 4/00* (2006.01)
*H01M 2/02* (2006.01)
*H01M 2/26* (2006.01)
*H01M 2/04* (2006.01)
*H01M 2/08* (2006.01)
*H01M 10/052* (2010.01)

(52) U.S. Cl.

CPC ......... *H01M 2/0275* (2013.01); *H01M 2/027* (2013.01); *H01M 2/0413* (2013.01); *H01M 2/08* (2013.01); *H01M 2/263* (2013.01); *H01M 10/052* (2013.01)

(58) Field of Classification Search

CPC .. H01M 10/052; H01M 2/027; H01M 2/0275; H01M 2/0413; H01M 2/08; H01M 2/263
USPC .................................. 429/53, 128, 174, 175
See application file for complete search history.

(56) References Cited

U.S. PATENT DOCUMENTS 4,943,497 A * 7/1990 Oishi et al. ..................... 429/53
5,851,693 A 12/1998 Sano et al.
6,423,446 B1 * 7/2002 Miyazaki et al. ............ 429/209
(Continued)

FOREIGN PATENT DOCUMENTS

JP 1994-044014 6/1994
JP 2003123830 A 4/2003
(Continued)

OTHER PUBLICATIONS

Machine translation of JP2009-123375 (Year: 2018).*
(Continued)

*Primary Examiner* — Lingwen R Zeng
(74) *Attorney, Agent, or Firm* — Robert E. Bushnell

(57) ABSTRACT

There is provided a secondary battery in which a gasket is melted by internal heat generation to prevent the secondary battery from being short circuited to each other. In one embodiment, a secondary battery includes an electrode assembly having a positive electrode plate, a negative electrode plate and a separator interposed between the positive and negative electrode plates. A can accommodates the electrode assembly and is connected to the negative electrode plate through negative electrode tabs. A cap assembly is positioned at one side of the can and electrically connected to the positive electrode plate through a positive electrode tab. A gasket is positioned between the can and the cap assembly. In the secondary battery, the gasket is formed of a heat resistant material having a predetermined amount of heat-resistant enhancing material added thereto.

13 Claims, 5 Drawing Sheets

(56) References Cited

U.S. PATENT DOCUMENTS

| | | | | |
|---|---|---|---|---|
| 2001/0036571 | A1 * | 11/2001 | Oogami | H01M 2/023 429/94 |
| 2005/0079404 | A1 * | 4/2005 | Schubert et al. | 429/54 |
| 2005/0137074 | A1 * | 6/2005 | Crosbie | C03C 3/078 501/15 |
| 2006/0183020 | A1 * | 8/2006 | Davidson | H01M 2/08 429/174 |
| 2007/0154781 | A1 * | 7/2007 | Choi | H01M 2/0413 429/53 |
| 2009/0211163 | A1 | 8/2009 | Smith | |

FOREIGN PATENT DOCUMENTS

| | | | | |
|---|---|---|---|---|
| JP | 2009123375 | A | * | 6/2009 |
| KR | 100212227 | B | | 8/1999 |
| KR | 10-2007-0006248 | | | 1/2007 |
| KR | 10-2007-0055711 | | | 5/2007 |
| KR | 10-2007-0071235 | | | 7/2007 |
| KR | 10-2009-0073133 | | | 7/2009 |

OTHER PUBLICATIONS

Korean Notice of Allowance dated Nov. 7, 2011 in connection with Korean Patent Application Serial No. 10-2009-0103467 and Request for Entry of the Accompanying Office Action attached herewith.

Korean Office Action issued by KIPO, dated Mar. 22, 2011, corresponding to Korean Patent Application No. 10-2009-0103467, together with Request for Entry.

* cited by examiner

FIG.2 -Prior Art
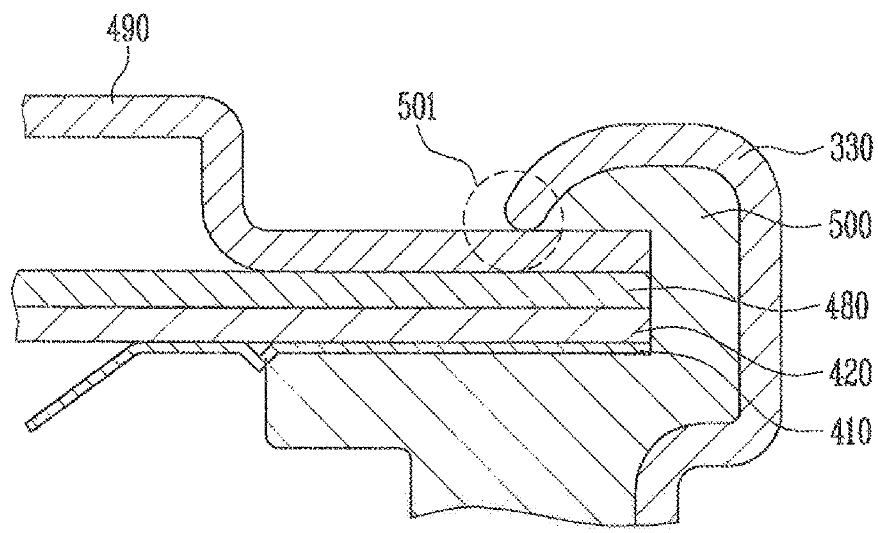
FIG. 3
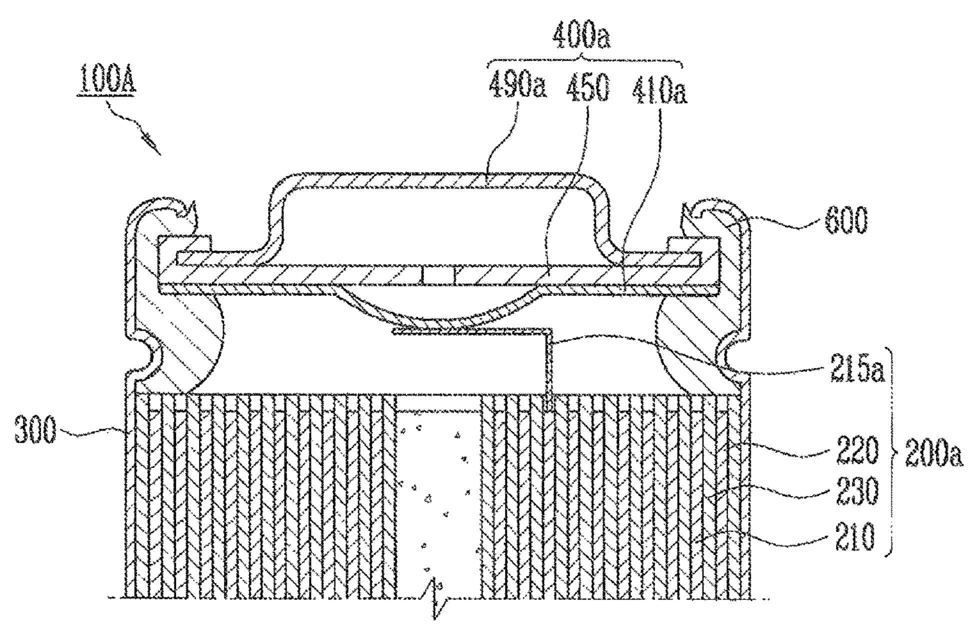

HIGH POWER SECONDARY BATTERY

CLAIM OF PRIORITY

This application makes reference to, incorporates the same herein, and claims all benefits accruing under 35 U.S.C. § 119 from an application earlier filed in the Korean Intellectual Property Office on 29 Oct. 2009 and there duly assigned Ser. No. 10-2009-0103467.

BACKGROUND OF THE INVENTION

Field of the Invention

An aspect of the present invention relates to a secondary battery, and more particularly, to a secondary battery in which a gasket remains durable, i.e., maintains its durability, while being melted by internal heat generation to prevent the secondary battery from being short-circuited.

Description of the Related Art

High power lithium secondary batteries used for electrical power tools require large current discharge because of their environmental characteristics. Particularly, a cylindrical high power secondary battery has an electrode tab with a limited width, therefore, a very large amount of heat is generated under the condition of large current discharge.

For example, instantaneous current or surge current that instantaneously flows in the cylindrical high power secondary battery may reach about 100 A. In this case, temperature increases rapidly at an electrode tab in the secondary battery. Therefore, a gasket interposed between a can and a cap assembly is melted, and thus, the can and the cap assembly (or a cap-up of the cap assembly) are short circuited to each other.

SUMMARY OF THE INVENTION

It is therefore one aspect of the present invention to provide an improved secondary battery in which a gasket remains durable while being melted by internal heat, in order to prevent a can and a cap assembly from being short circuited to each other.

It is another aspect of the present invention to provide an improved secondary battery which can improve durability and safety in the environment of large current discharge such as the environment of electrical power tools.

In accordance with an embodiment of the present invention, there is provided a secondary battery including an electrode assembly having a positive electrode plate, a negative electrode plate and a separator interposed between the positive and negative electrode plates; a can for accommodating the electrode assembly, the can being connected to the negative electrode plate through negative electrode tabs; a cap assembly positioned at one side of the can, the cap assembly being connected to the positive electrode plate through a positive electrode tab; and a gasket positioned between the can and the cap assembly. Here, the gasket is formed of a heat resistant material having a predetermined amount of heat-resistant enhancing material added thereto.

In one embodiment, the positive electrode tab is connected to at least a middle portion of the positive electrode plate.

In one embodiment, when the diameter of the can is about 18 mm and the height of the can is about 650 mm, the width of the positive electrode tab is about 3 mm to about 5 mm and the thickness of the positive electrode tab is about 0.1 mm to about 0.2 mm.

In one embodiment, the positive electrode tab is formed of aluminum.

In one embodiment, the negative electrode tabs are connected to both end portions of the negative electrode plate, respectively.

In one embodiment, the heat resistant material includes polymer having a melting point of about 180° C. to about 220° C.

In one embodiment, the heat resistant material includes any one selected from the group consisting of polypropylene, polybutylene terephthalate, polyethylene and polyimide, or mixture thereof.

In one embodiment, the heat-resistant enhancing material includes any one selected from the group consisting of ceramic, glass, glassfiber and combination thereof.

In one embodiment, the heat-resistant enhancing material of about 5 wt % to about 10 wt % is contained in the heat resistant material.

In accordance with embodiments of the present invention, the gasket maintains durable while being melted by internal heat of the secondary battery, so that it is possible to the can and the cap assembly from being short circuited to each other. As is generally explained by the American Society of Mechanical Engineers in "Energy Renewal," more durable materials will be needed for future (i.e., steam) energy production. In general, the term "durable" means that an element is able to resist wear, decay, etc., well; lasting; enduring. Here, the gasket maintains its original form or deforms slightly while maintaining the integrity of the electrical insulation between the can and the cap-up while being melted by internal heat of the secondary battery.

Further, it is possible to secure heat-resistance safety of the secondary battery under the environment of large current discharge such as the environment of electrical power tools. Furthermore, it is possible to prevent the battery from firing and causing explosion caused by the overcharge of the secondary battery when the can and the cap assembly are short circuited to each other, thereby improving safety of the secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a partial sectional view of a secondary battery constructed as an embodiment of the present invention.

DETAILED DESCRIPTION OF THE INVENTION

Figure 1:
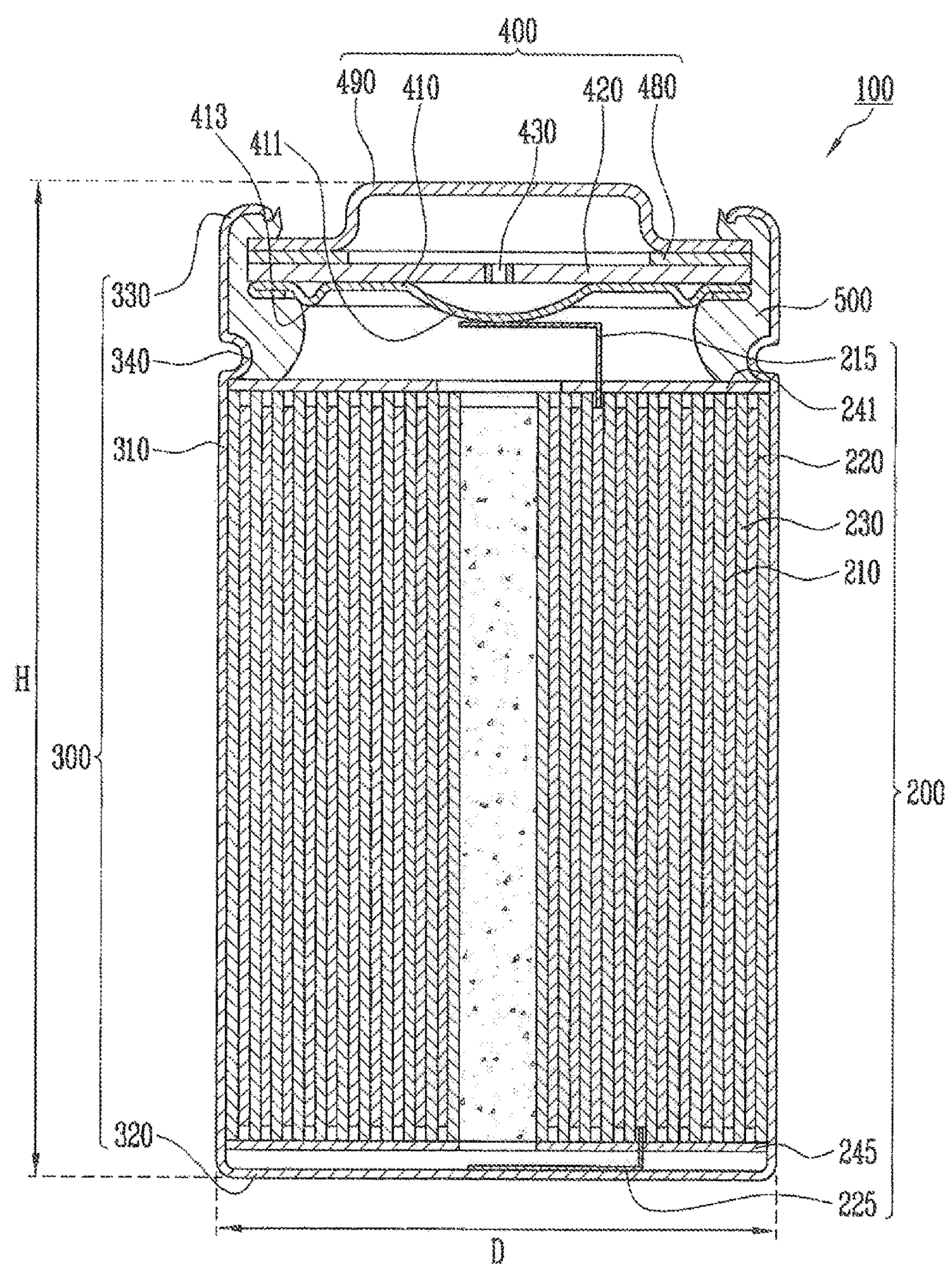
FIG. 1A is a sectional view of a secondary battery constructed as a comparative example.
FIG. 1B is an exploded perspective view of the secondary battery of FIG. 1A.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements. In the drawings, the thickness or size of layers are exaggerated for clarity and not necessarily drawn to scale.

Figure 2:
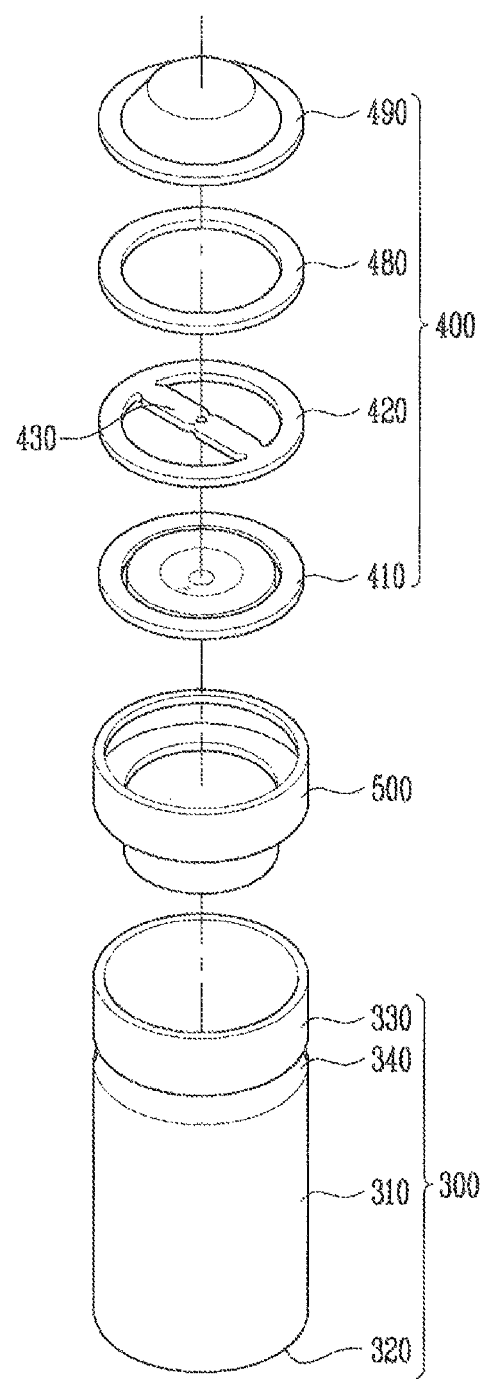
FIG. 2 is a partially enlarged sectional view of the secondary battery of FIG. 1A.

FIG. 1A is a sectional view of a secondary battery constructed as a comparative example. FIG. 1B is an exploded perspective view of the secondary battery of FIG. 1A. FIG. 2 is a partially enlarged sectional view of the secondary battery of FIG. 1A.

Referring to FIGS. 1A and 1B, secondary battery 100 constructed as the comparative example is configured as a cylindrical lithium secondary battery. Secondary battery 100 includes an electrode assembly 200; a cylindrical can 300 for accommodating electrode assembly 200 and an electrolyte; and a cap assembly 400 coupled to the upper portion of cylindrical can 300 to seal cylindrical can 300.

Electrode assembly 200 includes a positive electrode plate 210 formed by coating a positive electrode active material layer on a surface of a positive electrode collector; a negative electrode plate 220 formed by coating a negative electrode active material layer on a surface of a negative electrode collector; and a separator 230 positioned between the positive and negative electrode plates 210 and 220 to allow positive and negative electrode plates 210 and 220 to be electrically isolated from each other. Electrode assembly 200 is formed by winding positive electrode plate 210, negative electrode plate 220 and separator 230 in a jelly-roll shape. A positive electrode tab 215 is provided to electrically connect positive electrode plate 210 to cap assembly 400, and a negative electrode tab 225 is provided to electrically connect negative electrode plate 220 to can 300.

Insulating plates 241 and 245 for preventing contact with cap assembly 400 or cylindrical can 300 are formed at the top and bottom of electrode assembly 200, respectively.

Cylindrical can 300 includes a cylindrical side plate 310 having a constant diameter to form a predetermined space for accommodating the wound electrode assembly 200, and a bottom plate 320 for sealing the bottom of cylindrical side plate 310. An opening through which electrode assembly 200 is inserted into can 300 is provided at the top of cylindrical side plate 310. If negative electrode tab 225 of the electrode assembly 200 is joined with bottom plate 320 of can 300, can 300 serves as a negative electrode. Can 300 is formed of aluminum (Al), iron (Fe) or alloy thereof.

Can 300 is provided with a crimping part 330 bent inward to pressurize an upper portion of cap assembly 400. Can 300 is also provided with a beading part 340 deeply dug inward to pressurize a lower portion of cap assembly 400 at the position spaced downward from crimping part 330 by the distance corresponding to the thickness of cap assembly 400.

Cap assembly 400 includes a safety vent 410, a current blocking part 420, a secondary protection element 480 and a cap-up 490. Safety vent 410, current blocking part 420, secondary protection element 480 and cap-up 490 are sequentially positioned adjacent to electrode assembly 200 and stacked with one another. Safety vent 410, current blocking part 420 and secondary protection element 480 may be integrally formed as one integrated and monolithic entity to decrease the volume and mass of the secondary battery and to reduce contact resistance through a decrease of the contact surface between components. Safety vent 410 has a groove 413.

Safety vent 410 is formed in a plate shape and provided with a projection 411 protruding downward from the center portion thereof. Positive electrode tab 215 is welded to the projection. Safety vent 410 is formed so that projection 411 is deformed upward by overpressure generated inside the secondary battery and then separated from positive electrode tab 215 or so that a weak portion around projection 411 is broken by the overpressure generated inside the secondary battery.

Current blocking part 420 is formed so that the center portion 430 of current clocking part 420 is broken when the pressure generated inside the secondary battery extremely increases. Current blocking part 420 is provided with a conductive layer for electrically connecting safety vent 410 to secondary protection element 480 via the center portion 430 of current clocking part 420. The conductive layer may be formed of copper (Cu) or copper alloy.

If the temperature inside the secondary battery is extremely increased due to the internal short circuit or overcharge/overdischarge, secondary protection element 480 is subjected to thermal expansion by the extremely increased temperature. Therefore, secondary protection element 480 prevents electrical connection between current blocking part 420 and cap-up 480. For example, secondary protection element 480 may be formed as a positive temperature coefficient (PTC) element having an element layer formed of resin and carbon powder.

Cap-up 490 becomes a positive electrode terminal exposed to the top of secondary battery 100. Cap-up 490 is positioned at the uppermost portion of cap assembly 400. Cap-up 490 is electrically connected to positive electrode tab 215 with safety vent 410, current blocking part 420 and secondary protection element 480 interposed therebetween.

Gasket 500 is positioned between can 300 and cap assembly 400 and allows them to be electrically isolated from each other. Gasket 500 is formed of polypropylene of which melting point is about 175° C.

In secondary battery 100, gasket 500 is first inserted into can 300, and safety vent 410, current blocking part 420, secondary protection element 480 and cap-up 490 are sequentially inserted into can 300. Then, cap assembly 400 is crimped while gasket 500 is being inserted into can 300 by bending an upper edge of can 300. According to such a configuration, secondary battery 100 of the comparative example prevents leak of a gas or electrolyte generated therein.

Meanwhile, as illustrated in FIG. 2, when gasket 500 is melted and deforms, can 300 and cap-up 490 are short circuited to each other under the environment of electrical power tools, e.g., an environment of large current discharge in which instantaneous current or surge current of about 100 A flows in secondary battery 100. Moreover, if secondary battery 100 is charged in such a short-circuit state, the firing or explosion of secondary battery 100 may be caused.

Figure 4:
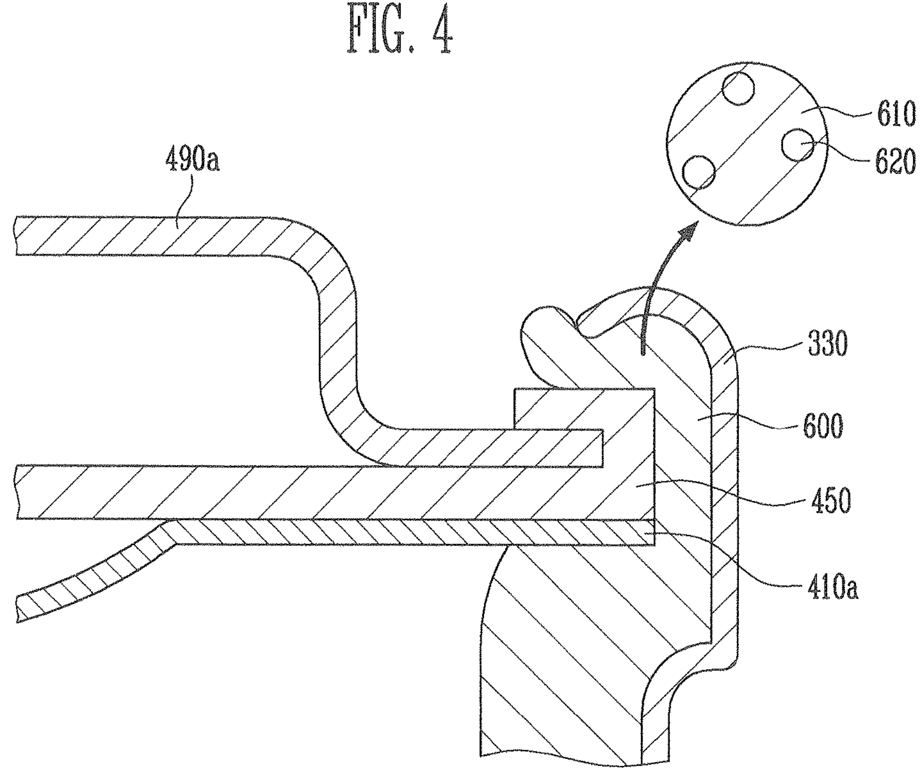
FIG. 4 is a partially enlarged sectional view of the secondary battery of FIG. 3.

FIG. 3 is a partial sectional view of a secondary battery constructed as an embodiment of the present invention. FIG. 4 is a partially enlarged sectional view of the secondary battery of FIG. 3.

Referring to FIG. 3, secondary battery 100A of this embodiment includes a cylindrical lithium secondary battery. Secondary battery 100A includes an electrode assembly 200*a*, a cylindrical can 300 for accommodating electrode assembly 200*a* and an electrolyte, and a cap assembly 400*a* connected to the top of can 300 to seal can 300. The electrolyte includes a nonaqueous electrolyte. The electrolyte may be a solid polymer containing lithium salt or a liquid polymer in which the lithium salt is dissociated in an organic solvent.

Electrode assembly 200*a* includes a positive electrode plate 210, a negative electrode plate 220 and a separator 230 interposed between positive and negative electrode plates 210 and 220. A positive electrode tab 215*a* electrically connects positive electrode plate 210 to the cap assembly 400*a*. A negative electrode tab (not shown, see 225 of FIG. 1A) electrically connects negative electrode plate 220 to can 300.

Cap assembly 400*a* includes a conductive plate 410*a*, a support plate 450 and a cap-up 490*a*. The positive electrode tab 215*a* may be connected to the conductive plate 410*a* by a method such as welding. Support plate 450 supports cap assembly 400*a* and electrically connects conductive plate 410*a* to cap-up 490*a*. Support plate 450 may be entirely conductive or may merely have a conductive layer formed at a portion thereof. Cap-up 490*a* serves as a positive electrode terminal exposed to the exterior of cap assembly 400*a*. Cap-up 490*a* may be adhered closely to an upper portion of support plate 450 by a bent edge portion of support plate 450. Conductive plate 410*a* and/or cap-up 490*a* may be integrally formed as one integrated and monolithic entity with support plate 450.

Cap assembly 400*a* of this embodiment is formed considering the environment of large current discharge such as environment of electrical power tools. For example, cap assembly 400*a* has a structure having a safety element such as PTC omitted therefrom. Here, the safety element is easily short-circuited in large current discharge, therefore, may cause a problem when the secondary battery is used.

A gasket 600 is positioned between can 300 and cap assembly 400*a*, and allows can 300 and cap assembly 400a to be electrically isolated from each other. Particularly, as illustrated in FIG. 4, gasket 600 of this embodiment protrudes convexly between the cap assembly and electrode assembly and contacts the cap assembly and electrode assembly, and is supported between the cap assembly and electrode assembly by following a convex shape of a beading portion while contacting a beading portion of the can.

Heat resistant material 610 may include any one selected from the group consisting of polypropylene (PP), polybutylene terephthalate (PBT), polyethylene and polyimide, or mixture thereof.

Heat-resistant enhancing material 620 is formed of a material having a higher melting point than that of the heat resistant material 610. For example, heat-resistant enhancing material 620 may include any one of ceramic, glass, glassfiber and combination thereof.

Gasket 600 may be formed by mixing heat-resistant enhancing material 620 of about 5 wt % to about 10 wt % with heat resistant material 610 in the melted or liquid state and then performing a hot injection molding with respect to the mixture. For example, heat-resistant enhancing material 620 may include superplastic ceramic or nano-glass that is a nano-particle material. By using the ceramic or glass nano-particle material, the heat resistant temperature of heat resistant material 610 may be increased by about 10° C. to about 20° C. However, there may be a slight difference depending on the kind of heat resistant material 610.

If heat-resistant enhancing material 620 having an amount less than 5 wt % is mixed with the heat resistant material 610, the heat-resistant enhancing effect of the gasket 600 may be disadvantageously insignificant. If the heat-resistant enhancing material 620 having an amount greater than 10 wt % is mixed with the heat resistant material 610, the elasticity of the gasket 600 may be disadvantageously lowered.

In accordance with this embodiment, when the reference temperature at which the gasket of the secondary battery is durable in the large current discharge or high power test is about 180° C. or about 230° C., a gasket using polypropylene (PP) with a melting point of about 175° C. as a main element is durable at the reference temperature of about 180° C., and a gasket using a material such as polybutylene terephthalate (PBT) with a melting point of about 220° C. as a main element is also durable at the test temperature of about 230° C. As described above, in accordance with this embodiment, the melting point of gasket 600 is increased by using heat-resistant enhancing material 620, so that it is possible to prevent can 300 and cap assembly 400*a* from being short circuited due to melting of the gasket 600 under the environment of large current discharge. The heat resistant material includes polymer having a melting point of about 180° C. to about 220° C.

Figure 5A:
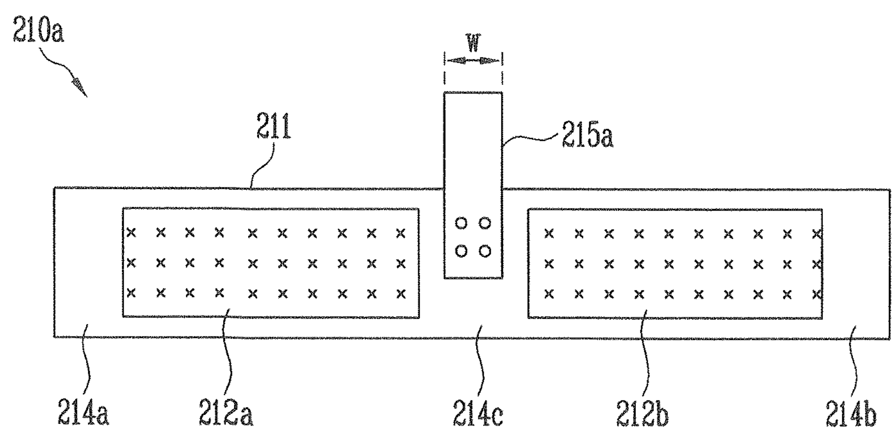
FIG. 5A is a plan view illustrating a positive electrode plate and a positive electrode tab, applicable to the secondary battery of FIG. 3.

FIG. 5A is a plan view illustrating a positive electrode plate and a positive electrode tab, applicable to the secondary battery of FIG. 3.

Referring to FIG. 5A, positive electrode plate 210*a* includes a positive electrode collector 211 formed of a metal foil with excellent conductivity, e.g., aluminum (Al) foil, and positive electrode active material layers 212*a* and 212*b* coated on both surfaces of the positive electrode collector 211. Positive electrode active material layer 212*a* and 212*b* may be formed to be spaced apart from each other at a predetermined interval.

In this embodiment, a positive electrode non-coating portion 214*c* may be formed at a middle portion of positive electrode plate 210*a*. Positive electrode non-coating portions 214*a* and 214*b* may be formed at both end portions of positive electrode plate 210*a*. Here, a positive electrode active material is not formed at the positive electrode non-coating portions. Meanwhile, both ends portions of positive electrode plate 210*a* may be omitted in the structure in which a positive electrode tab 215*a* is connected to the middle portion of positive electrode plate 210*a*.

In this embodiment, at least one positive electrode tab 215*a* is joined with positive electrode non-coating portion 214*c* positioned at the middle portion of positive electrode plate 210*a* by a method such as welding so as to be suitable for the environment of large current discharge. Positive electrode tab 215*a* is formed of an aluminum (Al) material. In order to connect positive electrode tab 215*a* to cap assembly 400*a*, positive electrode tab 215*a* extends upward from positive electrode plate 210*a* with a certain length.

In this case, positive electrode tab 215*a* is formed to have a width W of about 3 mm to about 5 mm and a thickness (not shown) of about 0.1 mm to about 0.2 mm. The dimension of positive electrode tab 215*a* is considered when the cylindrical can (sec cylindrical can 300 of FIGS. 1A and 1B) has a diameter D of about 18 mm and a height H of about 65 mm.

Here, the width and thickness of positive electrode tab 215*a* are about two times greater than the width (about 1 mm to about 3 mm) and thickness (about 0.05 mm to about 0.1 mm) of positive electrode tab 215 illustrated in FIG. 1A showing the comparative example. If positive electrode tab 215*a* having such a dimension is connected to the middle portion of positive electrode plate 210*a*, the secondary battery can be appropriately used in the environment of large current discharge such as the environment of electrical power tools.

Meanwhile, if the width W of positive electrode tab 215*a* exceeds about 5 mm or the thickness of positive electrode tab 215*a* exceeds about 0.2 mm, the electrode assembly wound while having positive electrode tab 215 connected thereto has a roughly triangular section. Therefore, such dimension is not preferable for the cylindrical secondary battery. When the size or diameter of the cylindrical can is increased, the width W and thickness of the positive electrode tab 215*a* may be formed larger in correspondence with the increase of the size of cylindrical can 300.

Figure 5B:
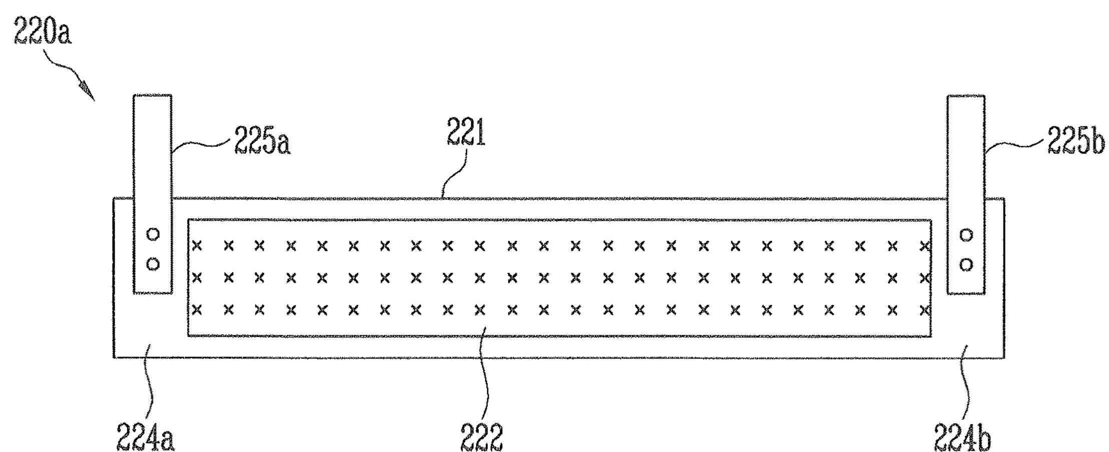
FIG. 5B is another plan view illustrating a negative electrode plate and a negative electrode tab, applicable to the secondary battery of FIG. 3.

FIG. 5B is another plan view illustrating a negative electrode plate and a negative electrode tab, applicable to the secondary battery of FIG. 3.

Referring to FIG. 5B, negative electrode plate 220*a* includes a negative electrode collector 221 formed of a conductive metal foil, e.g., copper (Cu) or nickel (Ni) foil, and a negative electrode active material layer 222 coated on both surface of negative electrode collector 221. Negative electrode non-coating portions 224*a* and 224*b* are formed at both end portions of negative electrode plate 220*a*. Here, a negative electrode active material layer is not formed at negative electrode non-coating portions 224*a* and 224*b*.

Negative electrode tabs 225*a* and 225*b* are connected to negative electrode non-coating portions 224*a* and 224*b* positioned at both end portions of the negative electrode plate 220*a*, respectively. Negative electrode tabs 225*a* and 225*b* may be formed of a nickel (Ni) material and extends to one side, e.g., an upside from electrode assembly 200 with a certain length. Alternatively, negative electrode tabs 225*a* and 225*b* may be formed to protrude from the negative electrode plate 220*a* to the downside opposite to the upside or the extending direction of the negative electrode collector 221.

If at least two negative electrode tabs 225*a* and 225*b* are connected to both end portions of the negative electrode plate 220*a*, the secondary battery can be appropriately used in the environment of large current/high power discharge such as the environment of electrical power tools.

In accordance with these embodiments, in the environment of applications such as electrical power tools, the gasket advantageously maintains its original form or alternatively deforms slightly while maintaining the integrity of the electrical insulation between the can and the cap-up and thereby assuring electrical insulation when the gasket is melted by the rapid increase in the internal temperature, so that the gasket may prevent the can and the cap-up from becoming short circuited to each other by remaining durable under high internal temperature.

In the environment of large current discharge while using such as a power tool, it is necessary to increase a width and thickness of the positive electrode tab in order to discharge a large amount of current easily and/or rapidly. Therefore, the positive electrode tab of the secondary battery is not burned to break with a rapid increase of internal temperature in the environment in which a large amount of current is discharged and a safety part is not functioning normally. When the positive electrode tab is not burned to break; however, the gasket will be melted due to a high internal temperature. As a result, there is a possibility of igniting a fire or exploding of the secondary battery in the case of melting of gasket. In accordance with this present invention, the gasket will be not melted in the environment of large current discharge using such as a power tool. Therefore, it is possible to prevent the secondary battery from igniting a fire or exploding.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:

a can accommodating and electrically connected to an electrode assembly; and a cap assembly disposed to seal the electrode assembly within the can, the cap assembly comprising:

a cap-up, a conductive plate separating the electrode assembly from the cap assembly, the conductive plate being connected to the electrode assembly by an electrode tab extending away from the electrode assembly and joined at a junction to the conductive plate, the conductive plate responding to overpressure generated inside the electrode assembly by one of deforming toward the cap-up and away from the junction and separating from the electrode tab or by breaking around a weak portion, a support plate disposed between the cap-up and the conductive plate, and having a bent edge portion enclosing edges of the cap-up; and a gasket protruding convexly between the cap assembly and electrode assembly and contacting the cap assembly and electrode assembly, and supported between the cap assembly and electrode assembly by following a convex shape of a beading portion while contacting a beading portion of the can, the gasket providing electrical isolation between the cap assembly and the electrode assembly and positioned between and the can and the cap assembly, the gasket contacting the support plate, the conductive plate, the can, and the electrode assembly but not contacting the cap-up, terminal edges of the bent edge portion of the support plate extending beyond the edges of the cap-up and terminal ends of the gasket, and during deformation of the gasket, isolating the edges of the cap-up from the gasket and from the can;

the gasket being formed of a heat resistant material having about 5 wt % to about 10 wt % of heat-resistant enhancing material, wherein the heat resistant material includes polymer having a melting point within a range of about 175° C. to about 220° C., said heat-resistant enhancing material consists of a superplastic ceramic or a nano-glass and has a melting point greater than 220° C.

2. The secondary battery according to claim 1, wherein the heat resistant material includes any one selected from the group consisting of polypropylene, polybutylene terephthalate, polyethylene and polyimide, or a mixture thereof.

3. The secondary battery of claim 1, wherein the electrode assembly has a positive electrode plate, a negative electrode plate and a separator interposed between the positive and negative electrode plates.

4. The secondary battery of claim 3, wherein the cap assembly being electrically connected to the positive electrode plate through the electrode tab.

5. The secondary battery of claim 4, wherein the electrode tab is connected to at least a middle portion of the positive electrode plate.

6. The secondary battery of claim 4, wherein the electrode tab is formed of aluminum.

7. The secondary battery of claim 4, wherein, when a diameter of the can is about 18 mm and a height of the can is about 650 mm, a width of the electrode tab is about 3 mm to about 5 mm and a thickness of the electrode tab is within a range of about 0.1 mm to about 0.2 mm.

8. The secondary battery of claim 4, comprised of the conductive plate has a flat portion and a curved portion, the flat portion of the conductive plate being in immediate contact with a flat surface of the support plate.

9. The secondary battery of claim 8, comprised of the flat portion of the conductive plate being in immediate contact with a flat surface of the support plate, an upper surface of the curved portion of the conductive plate disposed spaced apart from the support plate and a lower surface of the curved portion of the conductive plate being normally in operational contact with the electrode tab.

10. The secondary battery of claim 3, wherein the can is electrically connected to the negative electrode plate through a negative electrode tab.

11. The secondary battery of claim 4, wherein the positive electrode plate comprises a positive electrode collector and first and second electrode active material layers which are formed on both surfaces of the positive electrode collector and are spaced apart from each other on a same surface of the positive electrode collector at a predetermined interval, and the electrode tab disposed on the predetermined interval, an entirety of the material layers disposed spaced apart from edges of the positive electrode collector.

12. A secondary battery, comprising:

an electrode assembly having a positive electrode plate, a negative electrode plate and a separator interposed between the positive and negative electrode plates;

a can accommodating the electrode assembly, the can being electrically connected to the negative electrode plate through negative electrode tabs;

a cap assembly positioned at one side of the can, the cap assembly comprising a cap-up, a conductive plate, a support plate disposed immediately between the cap-up and the conductive plate, the cap assembly being electrically connected to the positive electrode plate through a positive electrode tab, the cap-up attached immediately to the support plate by a bent edge portion of the support plate, the conductive plate comprising a flat portion and a curved portion, the flat portion of the conductive plate being in immediate contact with a flat surface of the support plate, an upper surface of the curved portion of the conductive plate disposed spaced apart from the support plate and a lower surface of the curved portion of the conductive plate being in contact with the positive electrode tab at a junction, the conductive plate responding to overpressure generated inside the electrode assembly by one of deforming toward the cap-up and away from the junction and separating from the electrode tab or by breaking around a weak portion, and a gasket protruding convexly between the cap assembly and electrode assembly and contacting the cap assembly and electrode assembly, and supported between the cap assembly and electrode assembly by following a convex shape of a beading portion while contacting a beading portion of the can, the gasket being positioned between the can and the cap assembly and being in direct physical contact with the support plate, the conductive plate, the can, and the electrode assembly but not being in direct physical contact with the cap-up, terminal edges of the bent edge portion of the support plate extending beyond the edges of the cap-up and terminal ends of the gasket, and during deformation of the gasket, isolating the edges of the cap-up from the gasket and from the can;

the gasket being formed of a heat resistant material having about 5 wt % to about 10 wt % of heat-resistant enhancing material added thereto, with the positive electrode plate comprising a positive electrode collector and first and second electrode active material layers which are formed on both surfaces of the positive electrode collector and are spaced apart from each other on a same surface of the positive electrode collector at a predetermined interval, and the positive electrode tab disposed on the predetermined interval, an entirety of the material layers disposed spaced apart from edges of the positive electrode collector, wherein the heat resistant material comprising polymer having a melting point within a range of about 175° C. to about 220° C., said heat-resistant enhancing material consists of a superplastic ceramic or a nano-glass, and said heat-resistant enhancing material having a melting point greater than 220° C.

13. A secondary battery, comprising:

a can accommodating and electrically connected to an electrode assembly; and a cap assembly disposed to seal the electrode assembly within the can, the cap assembly comprising:

a cap-up, a conductive plate separating the electrode assembly from the cap assembly, the conductive plate deformed by a bulge that protrudes toward and is connected to the electrode assembly by an electrode tab extending away from the electrode assembly, the bulge responding to overpressure generated inside the electrode assembly by separating from the electrode tab; and a support plate disposed between the cap-up and the conductive plate, and having a bent edge portion enclosing edges of the cap-up; and a gasket providing electrical isolation between the cap assembly and the electrode assembly and positioned between and the can and the cap assembly, the gasket contacting the support plate, the conductive plate, the can, and the electrode assembly but not contacting the cap-up, the gasket protruding convexly between the cap assembly and electrode assembly and contacting the cap assembly and electrode assembly, and supported between the cap assembly and electrode assembly by following a convex shape of a beading portion while contacting a beading portion of the can, terminal edges of the bent edge portion of the support plate extending beyond the edges of the cap-up and terminal ends of the gasket, and during deformation of the gasket, isolating the edges of the cap-up from the gasket and from the can;

the gasket being formed of a heat resistant material having about 5 wt % to about 10 wt % of heat-resistant enhancing material, wherein the heat resistant material includes polymer having a melting point within a range of about 175° C. to about 220° C., said heat-resistant enhancing material consists of a superplastic ceramic or a nano-glass and has a melting point greater than 220° C.

* * * * *